US012630135B2

(12) United States Patent
Nemeth et al.

(10) Patent No.: US 12,630,135 B2
(45) **Date of Patent: *May 19, 2026**

(54) BRAKE SYSTEM FOR A MOTOR VEHICLE AND TRAILER CONTROL MODULE

(71) Applicant: KNORR-BREMSE Systeme fuer Nutzfahrzeuge GmbH, Munich (DE)

(72) Inventors: Huba Nemeth, Budapest (HU); Peter Szell, Budapest (HU); Matthias Seidenschwang, Munich (DE)

(73) Assignee: Knorr Bremse Systeme fuer Nutzfahrzeuge Gmbh, Munich (DE)

( * ) Notice: Subject to any disclaimer, the term of this patent is extended or adjusted under 35 U.S.C. 154(b) by 974 days.

This patent is subject to a terminal disclaimer.

(21) Appl. No.: 17/777,771

(22) PCT Filed: Nov. 10, 2020

(86) PCT No.: PCT/EP2020/081597
§ 371 (c)(1),
(2) Date: May 18, 2022

(87) PCT Pub. No.: WO2021/099179
PCT Pub. Date: May 27, 2021

(65) Prior Publication Data
US 2023/0001904 A1     Jan. 5, 2023

(30) Foreign Application Priority Data

Nov. 18, 2019     (EP) ..................................... 19209865

(51) Int. Cl.
B60T 13/68          (2006.01)
B60T 13/36          (2006.01)

(52) U.S. Cl.
CPC ............ B60T 13/683 (2013.01); B60T 13/36 (2013.01); *B60T 2270/402* (2013.01); *B60T 2270/413* (2013.01)

(58) Field of Classification Search
CPC .. B60T 13/683; B60T 13/36; B60T 2270/413; B60T 2270/402
See application file for complete search history.

(56) References Cited

U.S. PATENT DOCUMENTS

| | | | |
|---|---|---|---|
| 12,370,990 B2 * | 7/2025 | Nemeth .................. | B60T 13/26 |
| 2002/0124893 A1 | 9/2002 | Frank et al. | |

(Continued)

FOREIGN PATENT DOCUMENTS

| | | |
|---|---|---|
| CN | 1922065 A | 2/2007 |
| CN | 101959727 A | 1/2011 |

(Continued)

OTHER PUBLICATIONS

Chinese-language Office Action issued in Chinese Application No. 202080080375.7 dated Mar. 31, 2023 with English translation (11 pages).

(Continued)

*Primary Examiner* — Vishal R Sahni
(74) *Attorney, Agent, or Firm* — Crowell & Moring LLP

(57)          ABSTRACT

A trailer air supply and control module for a electronic brake system of a motor vehicle with a trailer interface, and a brake system of a motor vehicle with a trailer interface comprising the trailer air supply and control module, includes at least two electrical terminals configured to receive two independent but redundant electrical control input signals which comprise a signal for a preset brake control outlet pressure. At least one valve is configured to adjust a constant air pressure from an air pressure source to the preset brake outlet pressure. One pneumatic outlet terminal is configured to provide the preset brake supply outlet pressure to the pneumatic brake system of the trailer, and one pneumatic (Continued)

outlet terminal is configured to provide the preset brake control outlet pressure to the pneumatic brake system of the trailer.

15 Claims, 1 Drawing Sheet

(56)                References Cited

U.S. PATENT DOCUMENTS

| | | | |
|---|---|---|---|
| 2007/0170774 A1 | | 7/2007 | Gerum et al. |
| 2010/0078988 A1 | | 4/2010 | Bensch et al. |
| 2011/0062774 A1 | | 3/2011 | Bensch et al. |
| 2015/0239441 A1 | | 8/2015 | Klostermann et al. |
| 2019/0263371 A1 | * | 8/2019 | Goers ................... B60T 15/027 |
| 2021/0331657 A1 | * | 10/2021 | Mellings ................... B60T 8/94 |
| 2023/0021986 A1 | * | 1/2023 | Nemeth ................... B60T 13/26 |

FOREIGN PATENT DOCUMENTS

| | | |
|---|---|---|
| CN | 105015530 A | 11/2015 |
| DE | 103 10 235 A1 | 9/2004 |
| DE | 10 2006 041 011 A1 | 3/2008 |
| DE | 10 2018 108 825 A1 | 10/2019 |
| EP | 1 127 764 A2 | 8/2001 |
| EP | 2 913 236 A2 | 9/2015 |
| EP | 3 536 570 A1 | 9/2019 |
| KR | 10-2016-0037939 A | 4/2016 |

OTHER PUBLICATIONS

Korean-language Office Action issued in Korean Application No. 10-2022-7020571 dated Dec. 29, 2023 with English translation (10 pages).
International Search Report (PCT/ISA/210) issued in PCT Application No. PCT/EP2020/081597 dated Feb. 10, 2021 with English translation (four (4) pages).
German-language Written Opinion (PCT/ISA/237) issued in PCT Application No. PCT/EP2020/081597 dated Feb. 10, 2021 (five (5) pages).
European Search Report issued in European Application No. 19209865.5 dated Feb. 12, 2020 (seven (7) pages).

* cited by examiner

BRAKE SYSTEM FOR A MOTOR VEHICLE AND TRAILER CONTROL MODULE

BACKGROUND AND SUMMARY OF THE INVENTION

The invention relates to a brake system for a motor vehicle to be equipped with a trailer, comprising a trailer control module, and to a trailer control module for such a brake system.

Nowadays, brake systems of commercial vehicles are operated with compressed air, in both, motor vehicles and their trailers. In the brake system, the interface between motor vehicle and trailer is standardized with appropriate compressed air connections.

However, the electrification of brake systems in modern vehicles is an attractive way to reduce auxiliary energy consumption, space need and noise emissions. As trailers usually have a longer life cycle, and hence could have many different owners throughout their life cycles, a solution for the electrification of brake systems of motor vehicles should be compatible with existing brake systems of trailers, which usually still work with pneumatic brakes, in order to be able to continue using existing trailers with pneumatic brakes. Therefore, a solution is required, which is able to control, the pneumatic brake system of a trailer from the electro-mechanic brake system which is used preferably in modern motor vehicles.

In state of the art brake systems for motor vehicles and trailers, for example described in document DE10310235A1, the brakes of the trailer are controlled by trailer control valves (TCV) or a so-called trailer control module (TCM), which is/are positioned in the motor vehicle and therefore forms/form part of its brake system. In order to be able to provide brake pressure even if one signal does not work, a redundant independent signal is necessary. Hence, the TCVs/TCM comprise at least two independent control input terminals that are able to receive inputs from an electronic control unit (ECU) that processes the signals from a service brake, which is operated by the operator of the vehicle, if there is a need to slow the vehicle down. Those inputs from the ECU to the TCVs/TCM are either both pneumatic in case of the use of TCVs or one is pneumatic and one is electric from an electric control line in case of the use of a TCM. Moreover, TCMs comprise an inverted pneumatic control input coming from the parking brake, a compressed air supply inlet and two coupling head outputs, one for the air supply of the trailer and one for the electric control line for the trailer brakes. Furthermore, there is optionally a digital communication line between the motor vehicle and the trailer in the form of a 24V CAN bus, standardized according to ISO 11992. The description of an internal design of a state-of-the-art TCM is provided for example in the document EP1127764. A TCM according to the state of the art disclosed in the document is provided with three different solenoid valves, with which in combination of a relay valve allows to adjust the brake pressure for the braking units of a motor vehicle trailer.

With modern electro-mechanic brake systems of motor vehicles being able to provide only electrical outputs instead of at least one pneumatic output, the need for new TCMs arises. Therefore, it is the objective of the present invention to provide a TCM and a brake system for a motor vehicle with a TCM that are compatible with the pneumatic state-of-the-art trailer brake systems described above.

Such a TCM and a brake system for a motor vehicle with the TCM is provided by the subject-matters of the independent claims. Further developments of the invention with advantageous effects are provided by the dependent claims.

A trailer control module for a brake system of a motor vehicle according to the present invention is configured to provide a preset brake control outlet pressure to a pneumatic trailer brake system and comprises at least two electrical terminals, which are configured to receive two independent but redundant electrical control input signals, which comprise the signal for the preset brake control outlet pressure. It further comprises at least one pneumatic inlet terminal, which is configured to receive constant pressure from an air pressure source, at least one valve, configured to adjust the constant air pressure from the air pressure source to the preset break outlet pressure, and at least one pneumatic outlet terminal, configured to provide the preset brake control outlet pressure to the pneumatic brake system of the trailer.

In an advantageous embodiment of the invention the trailer control module comprises at least two control solenoid groups, each including a load- and an exhaust valve and each group allowing to control the brake control outlet pressure by itself and independently from one another via its own control channel. Each solenoid group is provided with its own independent but redundant signal from the two different ECUs. Hence, in order for the TCM to be able to process both different but redundant electric signals independently from each other in order to satisfy the existing safety requirements, it also needs two separate control channels in which the electric signals can be processed to the brake control outlet pressure. Thus, the control channel is formed by the technical elements like valves that define the brake control outlet pressure. An advantage of the use of solenoids in the TCM is that solenoids are well known in the state of the art, easy to handle also in terms of maintenance and don't need a lot of energy to be operated.

A further advantageous embodiment of the TCM according to the invention comprises a normally opened exhaust valve for normally not parked trailer control for each control channel of its relay valve.

In a further advantageous embodiment of the invention, the TCM comprises a normally closed exhaust valve and a feedback orifice to achieve a bistable parking brake operation for normally parked trailer control for each control channel of its relay valve.

In another advantageous embodiment of the invention the TCM comprises a normally closed exhaust valve and a feedback orifice for normally parked trailer control for one control channel and a normally opened exhaust valve for normally not parked trailer control for another control channel of its relay valve.

In yet another advantageous embodiment of the invention the TCM comprises at least two independent pressure sensors, configured to measure the brake control outlet pressure of the trailer. In this way the correct functionality of the brake system and the TCM can easily be controlled and adjusted by the ECUs of the motor vehicle brake system if necessary.

In a further advantageous embodiment of the invention, the trailer control module comprises a hold back valve to trigger the automatic trailer emergency braking at disconnection.

A motor vehicle brake system according to the invention comprises, at least two independent brake control units (ECUs) which are configured to provide the TCM with at least two independent but redundant electronic signals comprising the signal for the preset brake control outlet pressure. It further comprises a trailer control module according to the invention and an air pressure source, configured to supply a constant pneumatic pressure to the brakes of the trailer.

In an advantageous embodiment of the motor vehicle brake system according to the invention, it further comprises a communication line between the trailer and the brake control units, wherein a multiplexer is configured to connect the trailer to either one or the other brake control unit, so that only one brake control unit is connected with the trailer at the time.

Other objects, advantages and novel features of the present invention will become apparent from the following detailed description of one or more preferred embodiments when considered in conjunction with the accompanying drawings.

DETAILED DESCRIPTION

Figure 1:
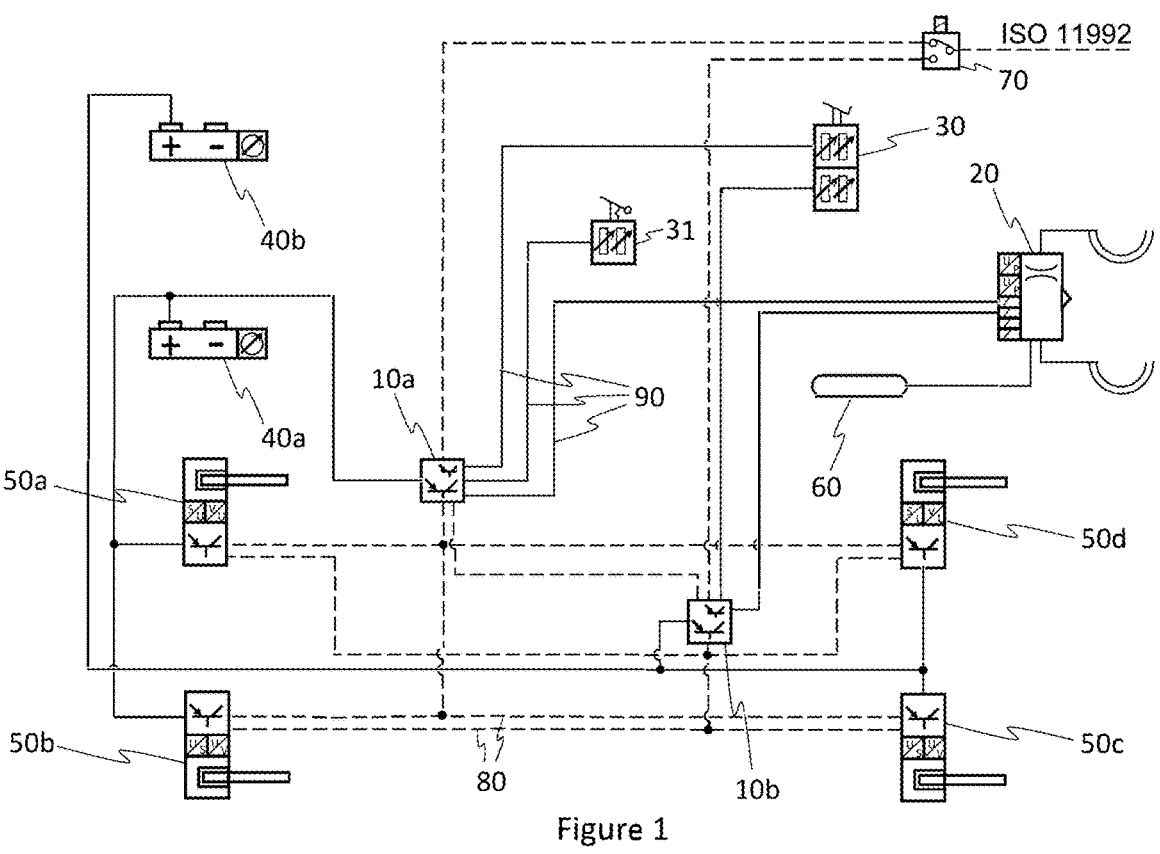
FIG. 1 illustrates a schematic layout of the motor vehicle brake system according to an embodiment of the invention.

FIG. 1 shows a schematic layout of the motor vehicle brake system according to an embodiment of the invention. The brake system according to the invention is powered by at least two independent electric energy sources 40a, 40b and controlled by at least two independent electronic control units 10a, 10b (ECU). The foot brake sensor 30 is operated by the operator of the motor vehicle in case that braking is necessary. The signal is provided at both, the first ECU 10a and the second ECU 10b. Further, a parking brake control 31 is connected with at least one of the ECUs 10a, or 10b. Both the parking brake control 31 and the foot brake sensor 30 are connected with the ECUs 10a, 10b via analog or digital electrical lines 90. The first ECU 10a is further connected with the second ECU 10b via a digital electric signal line 80. Both ECUs 10a, 10b are capable of controlling at least four wheel brake units 50a, 50b, 50c, 50d via a digital electrical line 80, so that both ECUs 10a, 10b are capable of commanding the wheel brake units 50a-50d through at least two independent communication lines.

The wheel brake units 50a, 50b as well as the first ECU 10a are powered by the first electric energy source 40a, while the wheel brake units 50c, 50d and the second ECU 10b are powered by the second electric energy source 40b.

In order to achieve braking performance of the trailer, both ECUs 10a, 10b send redundant electric signals via analog or digital electric lines 90 to a trailer control module (TCM) 20, which provides a braking outlet pressure to the trailer brake system. The TCM 20 is further connected to an air pressure source 60, which provides the TCM 20 with a constant pneumatic pressure. Thus, apart from the air pressure source 60, the TCM 20 is only provided with electric signals to adjust the brake pressure for the trailer.

A multiplexer 70 is connected with the trailer via a standardized CAN-bus according to ISO 11992 known from the state of the art and either passes the signals from the first ECU 10a or of the second ECU 10b to the trailer. It can be either physical (by an active switch) or functional (by e.g. an interconnected bus to both brake control units and a master is commanding and a slave is listening).

In operation, the operator (driver) of the motor vehicle operates the foot brake sensor (30) for normal service brake needs and the parking brake control, if a movement of the vehicle in standstill is to be prevented. The electric signal is passed to both ECUs 10a, 10b, where a necessary braking force is calculated, according to which the ECUs 10a, 10b control the wheel brake units 50a, 50b, 50c, 50d of the motor vehicle via the corresponding digital electric signal lines 80. Further, the information of a brake pressure, which needs to be applied to the pneumatic brake system of the trailer is passed via electric signals to the TCM 20 via the analog or digital electric line 90. With the given signals by the ECUs 10a, 10b and the constant pressure of the air pressure source 60, the TCM adjusts the demanded brake pressure and provides it to the brake system of the trailer. Further, information of either one of the ECUs 10a, 10b is provided to the trailer according to the position of the multiplexer 70 via the CAN-bus.

Figure 2:
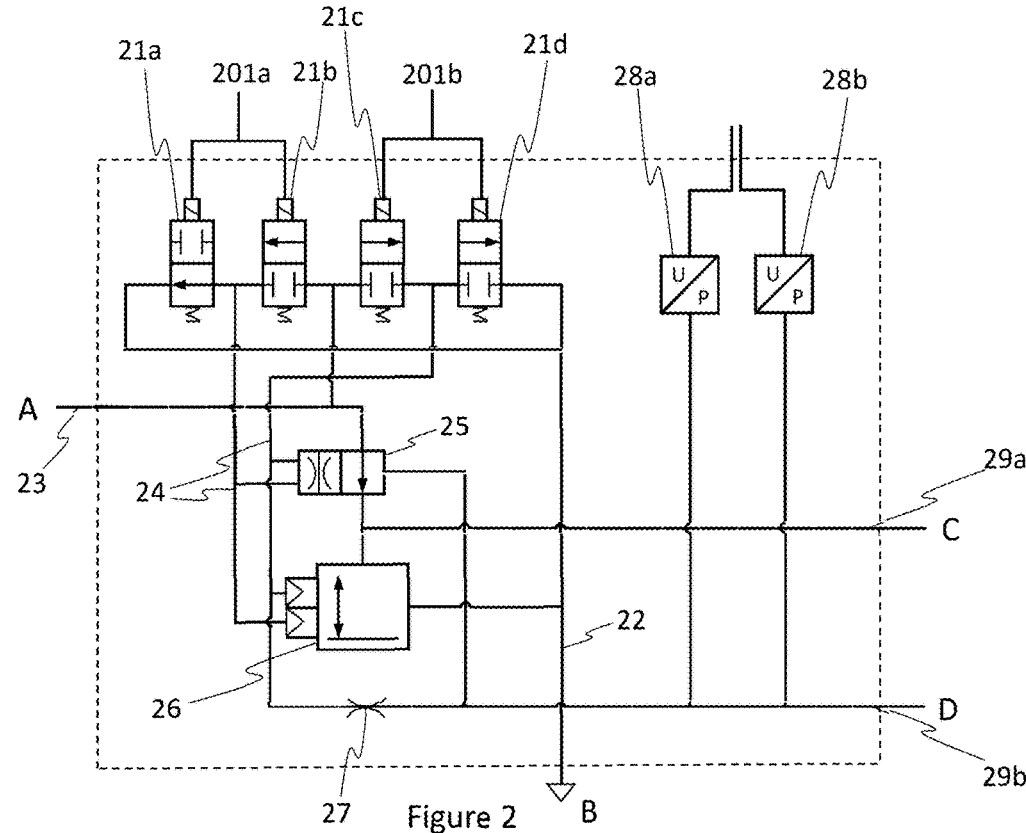
FIG. 2 illustrates a schematic layout of the architecture of a TCM according to an embodiment of the invention.

FIG. 2 shows a schematic layout of the architecture of a TCM according to an embodiment of the invention. The pneumatic pressure of the air pressure source 60 is provided at an air pressure source inlet A. The air pressure source inlet A is connected via an air pressure source pressure line 23 with a hold back valve 25 and two solenoid valves 21b and 21c. Both of them are in the following also referred to as load valves 21b, 21c and are in a normally closed state. At each side of the load valves 21b, 21c, two further solenoid valves 21a, 21d are positioned, which are also referred to as exhaust valves 21a, 21d, the exhaust valve 21a being in a normally opened state and the exhaust valve 21d being in a normally closed state. All of the four solenoid valves 21a-21d are controlled by the electric signals of the two ECUs 10a, 10b of the brake system of the motor vehicle. The solenoid valves 21a, 21b form one group controlled by the first ECU 10a and the solenoid valves 21c, 21d form a second group controlled by the second ECU 10b.

From both of the load valves 21b, 21c, a control pressure line 24 to the hold back valve 25 and to the corresponding exhaust valve 21a, 21d of each group is formed. Further the control pressure lines 24 from the load valves 21b, 21c also connect a dual channel relay valve 26 and an orifice 27. A further pressure line, referred to as exhaust pressure line 22, leads from the outlets of the exhaust valves 21a, 21d and the dual channel relay valve 26 to an exhaust outlet terminal B, where pressure, which is not needed anymore in the system, can be released to the atmosphere.

Moreover, one outlet of the hold back valve 25 is connected to one inlet of the dual channel relay valve 26 via a first outlet brake pressure supply line 29a, which also leads to a first outlet brake pressure terminal C. As mentioned above, one outlet of the dual relay valve 26 is connected to the exhaust outlet terminal B. Another outlet of the dual relay valve 26 is connected to a second outlet brake pressure control terminal D by a second outlet brake pressure line 29b. The pressure in the second outlet brake pressure line 29b is measured by two pressure sensors 28a, 28b, which are permanently connected via an analog or digital line with both ECUs 10a, 10b.

In the embodiment of the invention shown in FIG. 2, the pressure provided by the air pressure source 60 at the air pressure source inlet A is provided directly at the first outlet brake pressure supply terminal C under normal operation and switches to its orifice position in case of an unexpected trailer disconnection to introduce an emergency braking to the trailer.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

REFERENCE LIST

10*a* first electronic control unit
10*b* second electronic control unit
20 Trailer control module
201*a*, 201*b* electrical terminal
21*a*, 21*d* solenoid valve: exhaust valve
21*b*, 21*c* solenoid valve: load valve
22 exhaust pressure line
23 air pressure source pressure line
24 control pressure line
25 hold back valve
26 dual channel relay valve
27 orifice
28*a*, 28*b* pressure sensors
29*a* compressed air brake supply outlet
29*b* compressed air brake control outlet
30 foot brake sensor
31 parking brake control
40*a* first electric energy source
40*b* second electric energy source
50*a*, 50*b*, 50*c*, 50*d* wheel brake unit
60 air pressure source
70 multiplexer
80 digital electric signal line
90 analog or digital electric line
A air pressure source inlet
B exhaust outlet terminal
C compressed air brake supply terminal to the trailer (first outlet brake pressure supply terminal)
D compressed air brake control terminal to the trailer (second outlet brake pressure control terminal)

The invention claimed is:

1. A trailer control module for a brake system of a motor vehicle with a trailer having a pneumatic brake system, the trailer control module comprising:
   at least two electrical terminals configured to receive two independent but redundant electrical control input signals corresponding to a signal for a preset brake control outlet pressure;
   at least one pneumatic inlet terminal configured to receive compressed air from an air pressure source;
   at least one valve configured to adjust a constant air pressure from the air pressure source to the preset brake outlet pressure;
   a first one pneumatic outlet terminal configured to provide a brake supply outlet pressure to the pneumatic brake system of the trailer;
   a second pneumatic outlet terminal configured to provide the preset brake control outlet pressure to the pneumatic brake system of the trailer; and
   at least two control solenoid groups, each of the at least two control solenoid groups forming part of a control channel including at least one load valve and at least one exhaust valve, such that each of the at least two control solenoid groups is configured to control brake control outlet pressure by itself and independently from one another via its own control channel;
   wherein the at least one exhaust valve of a first one of the at least two control solenoid groups is a normally opened exhaust valve configured to provide normally not parked trailer control for each control channel.

2. The trailer control module according to claim 1, further comprising:

at least two independent pressure sensors configured to measure the brake control outlet pressure of the trailer.

3. The trailer control module according to claim 1, further comprising:
   a hold back valve configured to trigger automatic trailer emergency braking when a trailer brake pressure supply line is disconnected when a trailer is connected to a motor vehicle.

4. A trailer control module for a brake system of a motor vehicle with a trailer having a pneumatic brake system, the trailer control module comprising:
   at least two electrical terminals configured to receive two independent but redundant electrical control input signals corresponding to a signal for a preset brake control outlet pressure;
   at least one pneumatic inlet terminal configured to receive compressed air from an air pressure source;
   at least one valve configured to adjust a constant air pressure from the air pressure source to the preset brake outlet pressure;
   a first one pneumatic outlet terminal configured to provide a brake supply outlet pressure to the pneumatic brake system of the trailer;
   a second pneumatic outlet terminal configured to provide the preset brake control outlet pressure to the pneumatic brake system of the trailer; and
   at least two control solenoid groups, each of the at least two control solenoid groups forming part of a control channel including at least one load valve and at least one exhaust valve, such that each of the at least two control solenoid groups is configured to control brake control outlet pressure by itself and independently from one another via its own control channel, wherein
   the at least one exhaust valve of a second one of the at least two control solenoid groups is a normally closed exhaust valve, and
   the normally closed exhaust valve and a feedback orifice are configured to provide a bistable parking brake operation for normally parked trailer control for each control channel.

5. The trailer control module according to claim 4, further comprising:
   at least two independent pressure sensors configured to measure the brake control outlet pressure of the trailer.

6. The trailer control module according to claim 4, further comprising:
   a hold back valve configured to trigger automatic trailer emergency braking when a trailer brake pressure supply line is disconnected when a trailer is connected to a motor vehicle.

7. A trailer control module for a brake system of a motor vehicle with a trailer having a pneumatic brake system, the trailer control module comprising:
   at least two electrical terminals configured to receive two independent but redundant electrical control input signals corresponding to a signal for a preset brake control outlet pressure;
   at least one pneumatic inlet terminal configured to receive compressed air from an air pressure source;
   at least one valve configured to adjust a constant air pressure from the air pressure source to the preset brake outlet pressure;
   a first one pneumatic outlet terminal configured to provide a brake supply outlet pressure to the pneumatic brake system of the trailer;

a second pneumatic outlet terminal configured to provide the preset brake control outlet pressure to the pneumatic brake system of the trailer; and at least two control solenoid groups, each of the at least two control solenoid groups forming part of a control channel including at least one load valve and at least one exhaust valve, such that each of the at least two control solenoid groups is configured to control brake control outlet pressure by itself and independently from one another via its own control channel, wherein the at least one exhaust valve of a second one of the at least two control solenoid groups is a normally closed exhaust valve, the normally closed exhaust valve and a feedback orifice are configured to provide a bistable parking brake operation for normally parked trailer control for a first control channel, and the at least one exhaust valve of a first one of the at least two control solenoid groups is a normally opened exhaust valve configured to provide normally not parked trailer control for a second control channel.

8. The trailer control module according to claim 7, further comprising:

at least two independent pressure sensors configured to measure the brake control outlet pressure of the trailer.

9. The trailer control module according to claim 7, further comprising:

a hold back valve configured to trigger automatic trailer emergency braking when a trailer brake pressure supply line is disconnected when a trailer is connected to a motor vehicle.

10. A motor vehicle brake system comprising:

at least two independent brake control units; and a trailer control module having at least two electrical terminals configured to receive two independent but redundant electrical control input signals corresponding to a signal for a preset brake control outlet pressure, at least one pneumatic inlet terminal configured to receive compressed air from an air pressure source;

at least one valve configured to adjust a constant air pressure from the air pressure source to the preset brake outlet pressure, a first one pneumatic outlet terminal configured to provide a brake supply outlet pressure to the pneumatic brake system of the trailer, a second pneumatic outlet terminal configured to provide the preset brake control outlet pressure to the pneumatic brake system of the trailer; and an air pressure source configured to supply a constant pneumatic pressure to the brakes of a trailer, wherein each brake control unit is configured to provide an independent but redundant electric control signal to the trailer control module;

wherein the trailer control module includes at least two control solenoid groups, each the at least two control solenoid groups forming part of a control channel including at least one load valve and at least one exhaust valve, such that each of the at least two control solenoid groups is configured to control brake control outlet pressure by itself and independently from one another via its own control channel;

wherein the at least one exhaust valve of a first one of the at least two control solenoid groups is a normally opened exhaust valve configured to provide normally not parked trailer control for each control channel.

11. The motor vehicle brake system according to claim 10, further comprising:

a communication line between a trailer and the brake control units, and a multiplexer configured to permit only one of the at least two brake control units to be connected with the trailer at a time.

12. A motor vehicle brake system comprising:

at least two independent brake control units; and a trailer control module having at least two electrical terminals configured to receive two independent but redundant electrical control input signals corresponding to a signal for a preset brake control outlet pressure, at least one pneumatic inlet terminal configured to receive compressed air from an air pressure source;

at least one valve configured to adjust a constant air pressure from the air pressure source to the preset brake outlet pressure;

a first one pneumatic outlet terminal configured to provide a brake supply outlet pressure to the pneumatic brake system of the trailer;

a second pneumatic outlet terminal configured to provide the preset brake control outlet pressure to the pneumatic brake system of the trailer;

an air pressure source configured to supply a constant pneumatic pressure to the brakes of a trailer; and at least two control solenoid groups, each of the at least two control solenoid groups forming part of a control channel including at least one load valve and at least one exhaust valve, such that each of the at least two control solenoid groups is configured to control brake control outlet pressure by itself and independently from one another via its own control channel;

wherein each brake control unit is configured to provide an independent but redundant electric control signal to the trailer control module;

wherein the at least one exhaust valve of a second one of the at least two control solenoid groups is a normally closed exhaust valve; and wherein the normally closed exhaust valve and a feedback orifice are configured to provide a bistable parking brake operation for normally parked trailer control for each control channel.

13. The motor vehicle brake system according to claim 12, further comprising:

a communication line between a trailer and the brake control units; and a multiplexer configured to permit only one of the at least two brake control units to be connected with the trailer at a time.

14. A motor vehicle brake system comprising:

at least two independent brake control units; and a trailer control module having at least two electrical terminals configured to receive two independent but redundant electrical control input signals corresponding to a signal for a preset brake control outlet pressure, at least one pneumatic inlet terminal configured to receive compressed air from an air pressure source;

at least one valve configured to adjust a constant air pressure from the air pressure source to the preset brake outlet pressure;

a first one pneumatic outlet terminal configured to provide a brake supply outlet pressure to the pneumatic brake system of the trailer;

a second pneumatic outlet terminal configured to provide the preset brake control outlet pressure to the pneumatic brake system of the trailer;

an air pressure source configured to supply a constant pneumatic pressure to the brakes of a trailer; and at least two control solenoid groups, each of the at least two control solenoid groups forming part of a control channel including at least one load valve and at least one exhaust valve, such that each of the at least two control solenoid groups is configured to control brake control outlet pressure by itself and independently from one another via its own control channel;

wherein each brake control unit is configured to provide an independent but redundant electric control signal to the trailer control module;

wherein the at least one exhaust valve of a second one of the at least two control solenoid groups is a normally closed exhaust valve;

wherein the normally closed exhaust valve and a feedback orifice are configured to provide a bistable parking brake operation for normally parked trailer control for a first control channel; and wherein the at least one exhaust valve of a first one of the at least two control solenoid groups is a normally opened exhaust valve configured to provide normally not parked trailer control for a second control channel.

15. The motor vehicle brake system according to claim 14, further comprising:

a communication line between a trailer and the brake control units; and a multiplexer configured to permit only one of the at least two brake control units to be connected with the trailer at a time.

* * * * *